US010367678B2

(12) United States Patent
Natarajan et al.

(10) Patent No.: US 10,367,678 B2
(45) Date of Patent: Jul. 30, 2019

(54) MECHANISM FOR RAPID NETWORK FAILURE DETECTION FOR FASTER SWITCH-OVER IN SERVER-TO-SERVER APPLICATIONS

(71) Applicant: DELL PRODUCTS L.P., Round Rock, TX (US)

(72) Inventors: Avinash Natarajan, Chennai (IN); Balaji Venkat Venkataswami, Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 104 days.

(21) Appl. No.: 14/458,092

(22) Filed: Aug. 12, 2014

(65) Prior Publication Data

US 2016/0050102 A1 Feb. 18, 2016

(51) Int. Cl.

| | |
|---|---|
| G06F 15/16 | (2006.01) |
| H04L 12/24 | (2006.01) |
| G01R 31/08 | (2006.01) |
| H04L 12/741 | (2013.01) |
| H04L 12/26 | (2006.01) |
| H04L 12/721 | (2013.01) |
| H04L 12/703 | (2013.01) |

(52) U.S. Cl.
CPC ........ *H04L 41/046* (2013.01); *H04L 43/0811* (2013.01); *H04L 43/10* (2013.01); *H04L 45/28* (2013.01); *H04L 45/70* (2013.01)

(58) Field of Classification Search
CPC . H04L 41/0213; H04L 43/0817; H04L 12/56; H04L 45/02; H04L 45/22; H04L 45/28; H04L 69/40; H04L 67/14; H04L 41/0631; H04L 41/046; H04L 41/0668; H04L 43/0811; H04L 43/10; H04L 45/70; H04L 41/0663; H04L 45/74; H04L 45/50; H04W 80/00; G06F 15/16
USPC ......................................................... 370/228
See application file for complete search history.

(56) References Cited

U.S. PATENT DOCUMENTS

| | | | |
|---|---|---|---|
| 8,488,444 B2 * | 7/2013 | Filsfils | ................... H04L 45/02 370/217 |
| 8,953,460 B1 * | 2/2015 | Addepalli | ............... H04L 43/10 370/241 |

(Continued)

*Primary Examiner* — Steven H Nguyen
*Assistant Examiner* — Vanneilian Lalchinthang
(74) *Attorney, Agent, or Firm* — North Weber & Baugh LLP

(57) ABSTRACT

Embodiments of the present invention comprise systems and methods for monitoring communication connectivity between applications remotely separated from each other in a network. The system includes: one or more processors; a memory communicatively coupled to the one or more processors; a network interface communicatively coupled to the one or more processors; and an agent communicatively coupled to the network interface and configured to: receive a registration for an application operating on the information handling system; monitor a liveliness status of a communication session between the agent and a remote agent operating on a remote information handling system, the communication session being enabled via the network interface; and notify the application of a fault in the communication session responsive to detecting that the fault exists.

20 Claims, 6 Drawing Sheets

(56) References Cited

U.S. PATENT DOCUMENTS

| | | | |
|---|---|---|---|
| 2008/0192849 A1* | 8/2008 | Kim | H04L 1/06 375/260 |
| 2008/0288577 A1* | 11/2008 | Clubb | H04L 29/06 709/202 |
| 2009/0037573 A1* | 2/2009 | Qiu | H04L 41/0663 709/224 |
| 2009/0106830 A1* | 4/2009 | Maher | H04L 63/0281 726/12 |
| 2011/0216846 A1* | 9/2011 | Lee | H04B 7/0473 375/295 |
| 2013/0058208 A1* | 3/2013 | Pfaff | H04L 12/4633 370/217 |
| 2013/0343174 A1* | 12/2013 | Guichard | H04L 45/22 370/218 |
| 2014/0156837 A1* | 6/2014 | Baskey | H04L 12/2697 709/224 |
| 2014/0177683 A1* | 6/2014 | Krishnamurthy | H04B 7/0469 375/219 |
| 2015/0188814 A1* | 7/2015 | Jain | H04L 45/74 370/392 |

* cited by examiner

MECHANISM FOR RAPID NETWORK FAILURE DETECTION FOR FASTER SWITCH-OVER IN SERVER-TO-SERVER APPLICATIONS

A. TECHNICAL FIELD

The present invention relates to detection of failure in a network communication, more particularly, to systems and methods for detecting liveliness of connectivity.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems In general, the conventional network elements spend a lot of resources to determine liveliness between two end-to-end devices. FIG. 1 shows a schematic diagram of a conventional network system/topology 100. As depicted, the nodes 102-108 can communicate with each other through the network, where top-of-racks (TORs) 120-126, leaves 130-136, and spines 140-146 are used to form multi-hop topology between the nodes 102-108. Hereinafter, the term TOR refers to a network element, such as switch, that a particular end node is directly connected to such that the failure of TOR completely disables the communication between the particular end node and the rest of the network 100. Each of the nodes 102 and 108 may be a server and have one or more applications 110-116 installed on the nodes 102-108. Hereinafter, the terms node and server may be used interchangeably. For the purpose of illustration, assume that only two nodes 102 and 106 are communicating with each other. However, it should be apparent to those of ordinary skill in the art that other nodes may communicate with each other. Also, other suitable number of nodes, TORs, leafs, and routers may be included in the network and other suitable number of applications may be installed on each of the nodes 102-108.

Each of the TORs 120-126 may be coupled to one or more leaves 130-136 in the network 100. Likewise, each of the leaves 130-136 may be coupled to one or more spines 140-146 in the network 100. One possible communication path between two application, say 110a and 114a, may be: application 110a→TOR 120→leaf 130→router 146→leaf 134→TOR 124→application 114a.

In the network 100, an application in the node 102 sends data to another application in the node 106 during a communication session therebetween. In addition, the application in the node 102 may send a "hello" packet to monitor the liveliness of communication session with the application(s) in the node 106. As the number of applications installed on each node increases, the number of "hello" packets exchanged between the nodes increases dramatically, requiring significant amount of traffic bandwidth and network resources. Also, when an application communicates according to a protocol, such as TCP, the timeout can be quite lengthy, resulting in a lot of dropped data traffic. Precious time may pass by before remedial action is taken, such as application 110a switching over to an alternative entity, say 112a, for resiliency.

This conventional approach results in unnecessary traffic bandwidth and resources of the network 100, and CPU processing of the nodes 102-108, and delay. Accordingly, there is a need for efficient systems and methods for detecting failure between nodes so that remedial action can be taken more quickly.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components or nodes may be implemented in software, hardware, or a combination thereof.

Furthermore, connections between components, nodes, switches, servers, routers within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
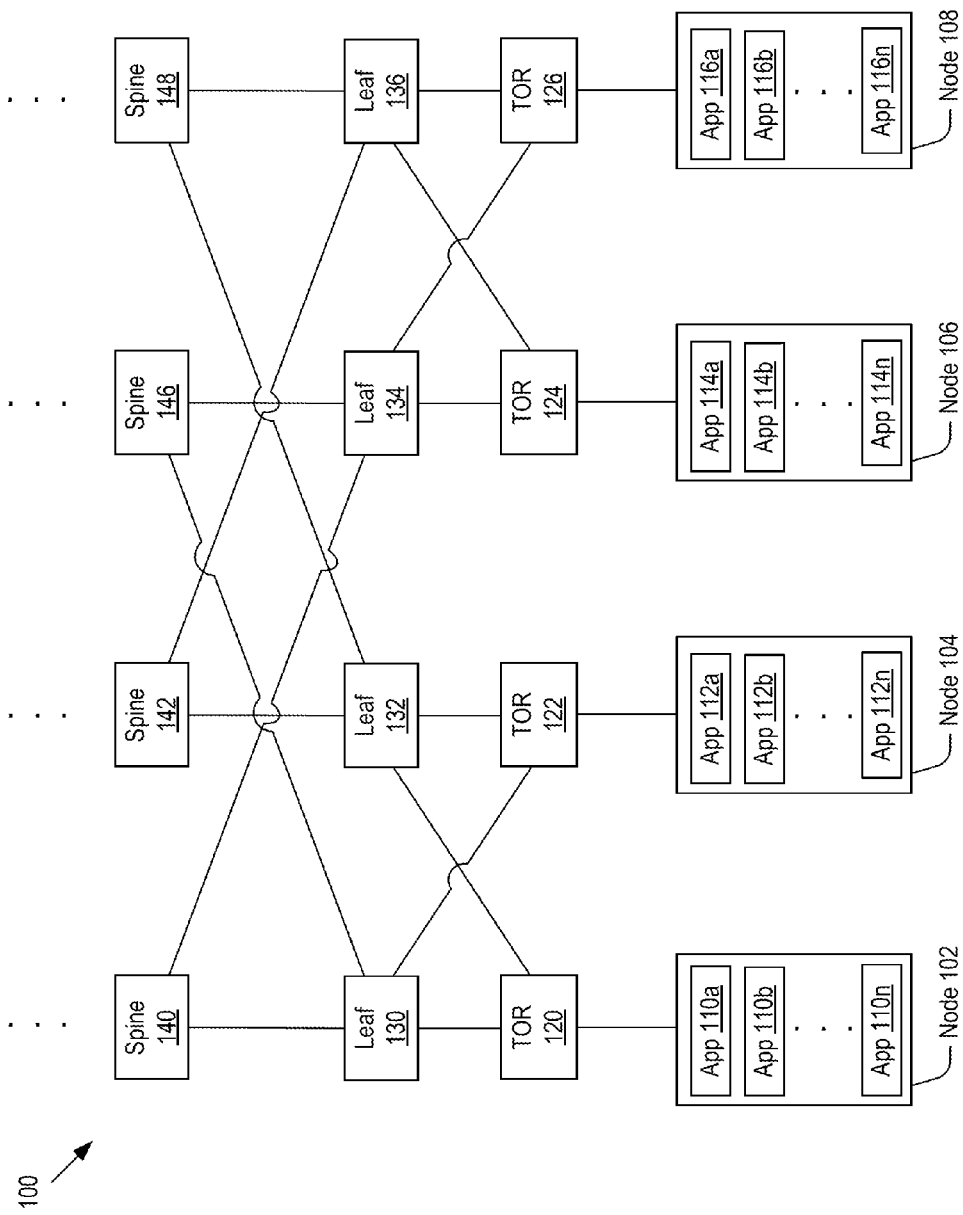
FIG. 1 shows a schematic diagram of a conventional network system.
Figure 2:
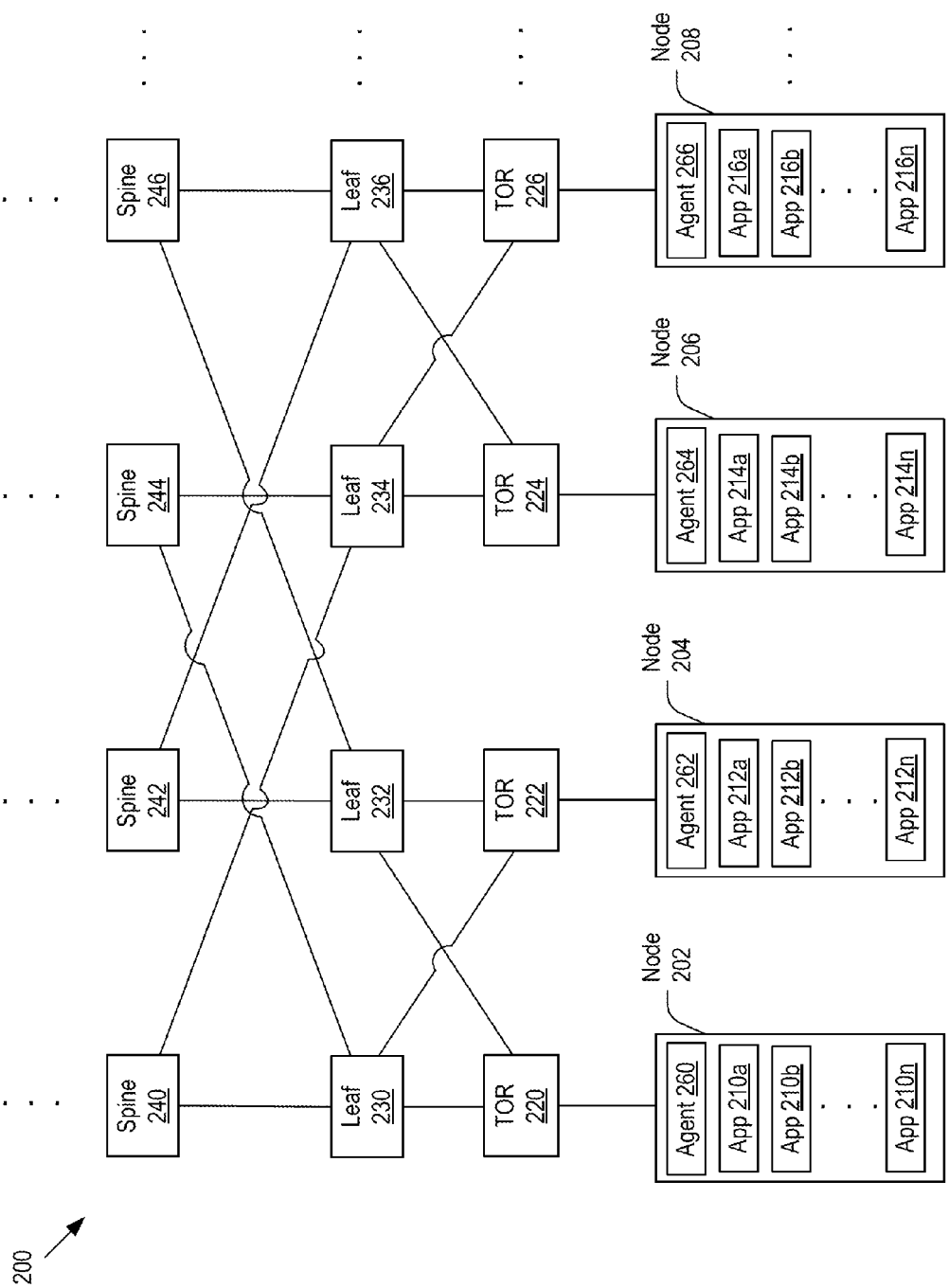
FIG. 2 shows a schematic diagram of a network system having failure detection functionality according to embodiments of the present invention.

FIG. 2 shows a schematic diagram of a network system 200 having failure detection functionality according to embodiments of the present invention. As depicted, the nodes 202-208 may communicate to each other through the network, where top-of-racks (TORs) 220-226, leaves 230-236, and routers 240-246 are used to form a multi-hop topology between the nodes 202-208. Each of the nodes 202 and 208 may include one or more servers, and one or more applications 210-216 may be installed on each node. For the purpose of illustration, it is assumed that only two nodes 202 and 206 are communicating with each other. However, it should be apparent to those of ordinary skill in the art that other nodes can communicate with each other. Also, other suitable number of nodes, TORs, leaves, and routers may be included in the network and other suitable number of applications may be installed on each of the nodes 202-208.

Each of the TORs 220-226 is coupled to one of the nodes 230-236 in the network 200, while each of the leaves 230-236 may be coupled to one or more routers 240-246 in a network 200. One possible communication path between two application, say 210a and 214a, may be: application 210a→TOR 220→leaf 230→router 244→leaf 234→TOR 224→application 214a.

In embodiments, each of the nodes 202-208 includes an agent in the corresponding hosting node. Each of the agents 260-266 has the capability to communicate with each other during a communication session so that an agent, say 260, is informed of the network failure when a link to TOR 224 goes down or a link in the path between the nodes 202 and 206 goes down during a communication session. In embodiments, the agent is a multi-hop bidirectional forwarding detection (BFD) agent that sends/receives data using a BFD protocol. Using the BFD protocol is beneficial because it has a short detection time and is well known in the art. However, it should be apparent to those of ordinary skill in the art that the agents may communicate to each other using other network communication protocols.

In embodiments, each of the applications 210a-201n may register with the BFD agent 260 using a modified TCP socket call. Each of the TCP sockets call includes a data field for identity, such as IP address, of a peer node with which the BFD session is to be undertaken. In embodiments, the TCP protocol used by the application 210a has a data field where the identity (ID) of the node 206 can be entered. In embodiments, the socket call may include a function call: Set_sock_opt (fd, BFD_REGISTER, struct suitable_structure_with_parameters), where fd stands for a file descriptor for the socket used for communication, BFD_REGISTER stands for a numerical value used to designate BFD related values passed in the structure, suitable_structure_with_parameters, and suitable_structure_wth_parameters is a structure containing suitable instructions to the called function to elicit values to be used in setting the BFD transactions for the socket session. It is noted that each application, say 210b, may specify the ID of other peer node, say 204, in the TCP socket call when the application 210b starts a communication session with the application 212b.

The TCP socket call may include a data field for timeout value for detecting down status of the other node. During a communication session, the BFD agent 260 keeps on sending a liveliness query data packet to the BFD agent 264 at each preset time interval and waits for acknowledgement data packet from the BFD agent 264. When the BFD agent 260 does not receive any acknowledgement data packet from the BFD agent 264 during the specified timeout period, the BFD agent 260 assumes that the communication session between the nodes 202 and 206 has dropped and sends a failure notification to the applications in the node 202 that have registered with the BFD agent 260 with the ID of the node 206. The timeout can be set to any suitable value, such as hundreds of milliseconds or any typical round-trip-time (RTT).

In embodiments, unlike the conventional systems where each application running on a node sends liveliness data packets to other applications running on another node, each BFD agent monitors the liveliness status of the communication path between two nodes, i.e., only a pair of BFD agents is monitoring the liveliness status on behalf of multiple applications. As such, the resources and bandwidths for checking liveliness status of the communication path can be significantly saved in the network 200. Also, since the timeout for detecting the failure is specified in the TCP socket call, each application can get the failure notice without waiting for its own lengthy timeout period.

If the failure of the communication session between the nodes 202 and 206 is due to the failure of TOR 224, the node 206 is isolated from the network 200 and cannot communicate to other components in the network. In such a case, the application 210a in the node 202 may start a communication session with other application, say 216a, in another node, say 208. Alternatively, the application 210a may retry the communication session later. However, if the communication session failure is due to the failure of other components in the path and thus, the node 206 is not isolated from the network 200, an alternative path may be established so that the communication session with the node 206 is resumed, to thereby provide resiliency for the failure. For instance, if the router 244 has failed, an alternative communication path may be: application 210a→TOR 220→leaf 230→router 240→leaf 234→TOR 224→application 214a. The TCP socket call may include data fields that need to be negotiated. Each BFD agent may receive the socket call information through a socket library.

Figure 3:
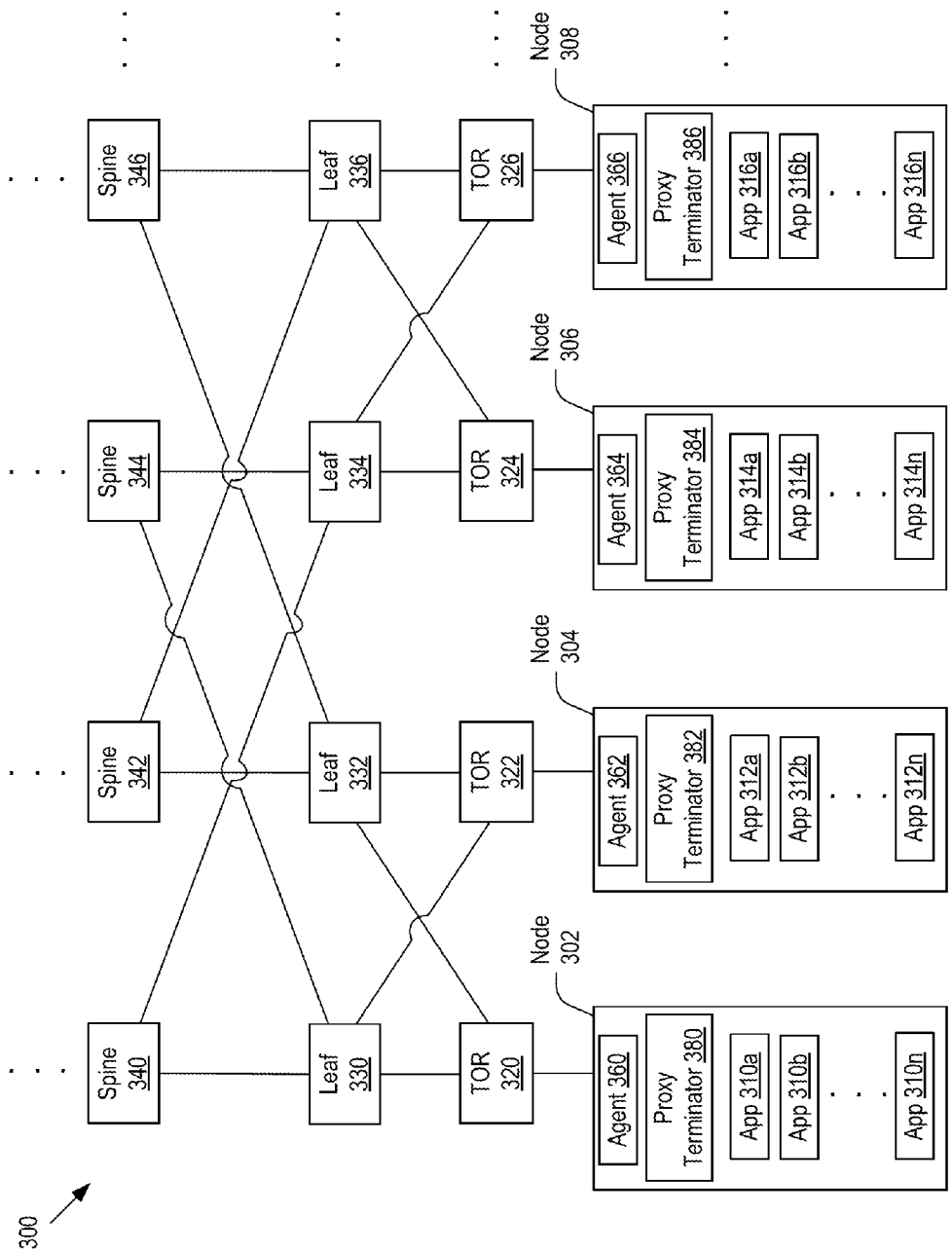
FIG. 3 shows a schematic diagram of a network system having failure detection functionality according to embodiments of the present invention.

FIG. 3 shows a schematic diagram of a network system 300 having failure detection functionality according to embodiments of the present invention. As depicted, the nodes 302-308 communicate with each other through the network, where top-of-racks (TORs) 320-326, leaves 330-336, and routers 340-346 are used to form a multi-hop topology between the nodes 302-308. Each of the nodes 302 and 308 may include one or more servers, and one or more applications 310-316 may be installed on each node. For the purpose of illustration, assume that only two nodes 302 and 306 are communicating with each other. However, it should be apparent to those of ordinary skill in the art that other nodes may communicate to each other. Also, other suitable number of nodes, TORs, leaves, and routers may be included in the network and other suitable number of applications may be installed on each of the nodes 302-308.

The network 300 is similar to the network 200, with the difference that proxy terminators (or, proxy agent) 380-386 are installed on the nodes 360-366. In the network 200, the applications 210-216 may need to be modified so that they have functionality to register with and get failure notifications from the BFD agents 260-266. To avoid requiring such modification at the application level, a proxy terminator may be installed on each of the nodes 360-366.

A proxy terminator acts as an intermediary between an application and the BFD agent by registering with a BFD agent running on the same hosting node on behalf of the application so that it acts as a client to the BFD agent. Since the applications 310-316 do not directly register with the BFD agents 360-366, no modification to the applications is required. Instead, the proxy terminators have intelligence enough to recognize the applications and register with the BFD agents on behalf of the applications.

When an application, say 310a in the node 302, wants to establish a communication session with another application, say 314a in the node 306, the proxy terminator 380 registers with the BFD agent 360 on behalf of the application 310a, providing an ID of the node 306 so that the proxy terminator 380 triggers a BFD session initiation for the node 306. Likewise, if the application 310b in the node 302 wants to establish a communication session with the application 316b in the node 308, the proxy terminator 380 registers with the BFD agent 360 on behalf of the application 310b, providing an ID of the node 308 so that the proxy terminator 380 triggers a BFD session initiation for the node 308. During each registration, a timeout value for detecting down status of the other node may be provided to the BFD agent.

During a communication session between nodes 302 and 306, the BFD agent 360 keeps on sending a liveliness query data packet to the BFD agent 364 at each preset time interval and waits for acknowledgement data packet from the BFD agent 364. When the BFD agent 360 does not receive any acknowledgement data packet from the BFD agent 364 during the specified timeout period, the BFD agent 360 assumes that the communication session between the nodes 302 and 306 has dropped and sends a failure notification to the proxy terminator 380. Then, the proxy terminator 380 in turn generates a signal, such as TCP reset signal for TCP applications or internet control message protocol (ICMP) Unreachable message for UDP applications, and sends the signal to the applications that are registered to the BFD server 380 and affected by the failure.

If the failure of communication session between the nodes 302 and 306 is due to the failure of TOR 324, the node 306 is isolated from the network 300 and cannot communicate to other elements in the network. In such a case, the application 310a in the node 302 may start a communication session with other application, say 316a, in another node, say 308. Alternatively, the application 310a may retry the communication session later. However, if the communication path failure is due to the failure of other components in the path and thus, the node 306 is not isolated from the network 300, an alternative path may be established so that the communication session with the node 306 is resumed, to thereby provide resiliency for the failure. For instance, if the session failure is due to the failure of the router 344, an alternative communication path may be: application 310a→TOR 320→leaf 330→router 340→leaf 334→TOR 324→application 314a.

Figure 4A:
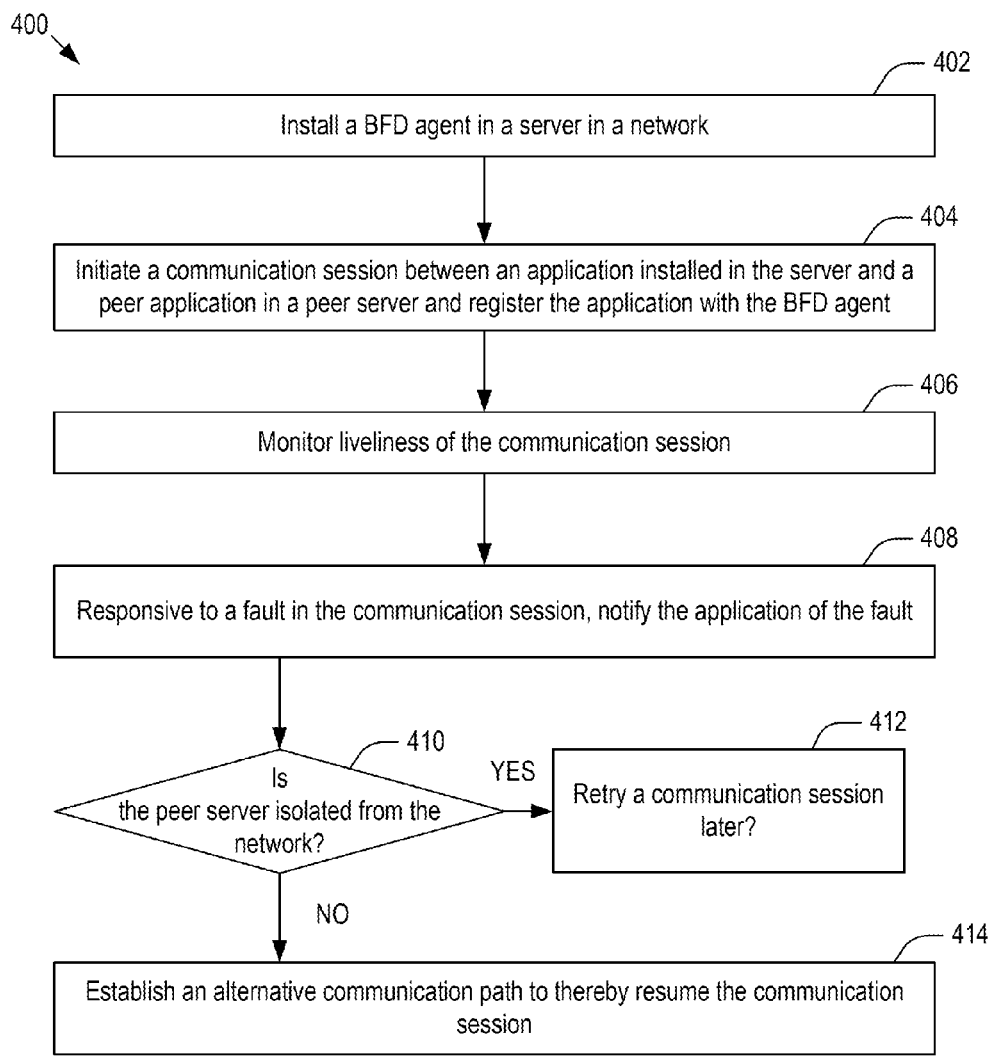
FIG. 4A shows a flowchart of an illustrative process for detecting network failure according to embodiments of the present invention.

FIG. 4A shows a flowchart 400 of an illustrative process for detecting network failure according to embodiments of the present invention. At step 402, a BFD agent is installed on a server/node in a network. Then, a communication session between a first application installed on the server and a second application installed on a peer server/node (or, equivalently, a remote server/node) is initiated, and the first application registers with the BFD agent at step 404. In embodiments, the first application registers itself with the BFD agent using one or more TCP socket calls, where the TCP socket calls include a data field for the ID of the peer server. Alternatively, a proxy terminator (or, equivalently, a proxy agent) may be installed on the server so that the proxy terminator registers with the BFD agent on behalf of the first application.

At step 406, the BFD agent establishes a communication session with a peer BFD agent installed on the peer server. As discussed above, the BFD agents monitor the liveliness status of the communication session therebetween to thereby monitor the communication session between the first and second applications. In embodiments, the BFD agent keeps on sending a liveliness query data packet (or, equivalently, liveliness checkup signal) to the peer BFD agent at each preset time interval and waits for acknowledgement data packet from the peer BFD agent. Hereinafter, the term "liveliness checkup signals" collectively refers to the liveliness query data packet and acknowledgement data packet. When the BFD agent does not receive any acknowledgement data packet from the peer BFD agent during a specified timeout period, the BFD agent assumes that the communication session with the peer BFD agent has dropped and sends a fault notification to the first application in the server at step 408. In embodiments, the BFD agent sends the notification directly to the first application. Alternatively, the BFD agent sends the notification to the proxy terminator, and the proxy terminator in turn generates a signal, such as TCP reset signal for TCP applications or internet control message protocol (ICMP) Unreachable message for UDP applications, and sends the signal to the first application.

At step 410, it is determined whether the peer server is isolated from the network. If the fault in the communication session between the BFD agents is due to the failure of TOR directly attached to the peer server, the peer server is isolated from the network. In such a case, the answer to the step 410 is positive and the process proceeds to step 412. At step 412, the first application may retry the communication session with the second application. Alternatively, the first application may start a new communication session with a third application installed in a third peer server.

If the communication session fault is due to the failure of other components in the communication path and thus, the peer server is not isolated from the network, an alternative communication path is established so that the communication session between the first and second applications is resumed, to thereby provide resiliency for the fault at step 414.

It is noted that more than one application may register with the BFD agent so that a set of applications installed on the server may share the same communication session between the BFD agent and the peer BFD agent. Hereinafter, the term "set of applications" refers to a partial or entire portion of the applications installed on the server. In such a case, the step 404 may be repeated for each of the set of applications. It is further noted that a second set of applications may register with the BFD agent so that the communication session between the second set of applications with remote applications is monitored by a communication session between the BFD agent and another peer BFD agent that the remote applications are registered with.

Figure 4B:
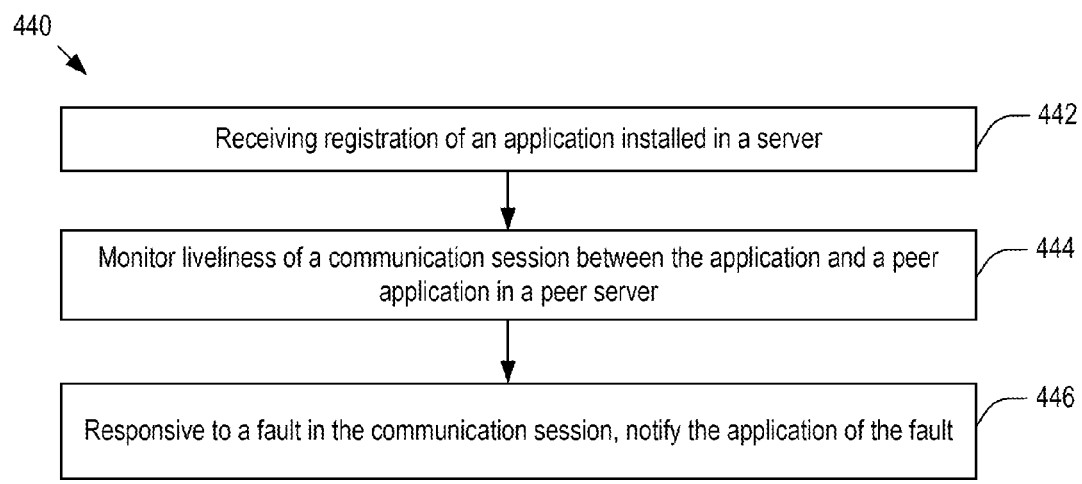
FIG. 4B shows a flowchart of an illustrative process for detecting network failure according to embodiments of the present invention.

FIG. 4B shows a flowchart 440 of an illustrative process for detecting network failure according to embodiments of the present invention. At step 442, a BFD agent installed on a server receives a registration of an application installed on the server. In embodiments, the applications register itself with the BFD agent, where the application establishes a communication session with a peer application installed on a peer server. Alternatively, a proxy terminator installed on the server registers with the BFD on behalf of the application.

At step 444, the BFD agent establishes a communication session with a peer BFD agent installed on the peer server. The BFD agent monitors liveliness status of the communication session with the peer BFD agent so that the communication session between the application and a peer application operating in the peer server is monitored. In embodiments, the BFD agent keeps on sending a liveliness query data packet to the peer BFD agent at each preset time interval and waits for acknowledgement data packet from the peer BFD agent. When the BFD agent does not receive any acknowledgement data packet from the peer BFD agent during a specified timeout period, the BFD agent assumes that the communication session with the remote BFD agent has failed and sends a fault notification to the application in the server at step 446. In embodiments, the BFD agent sends the notification directly to the application. Alternatively, the BFD agent sends the notification to the proxy terminator, and the proxy terminator in turn generates a signal, such as TCP reset signal for TCP applications or internet control message protocol (ICMP) Unreachable message for UDP applications, and sends the signal to the application.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, switch, route, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
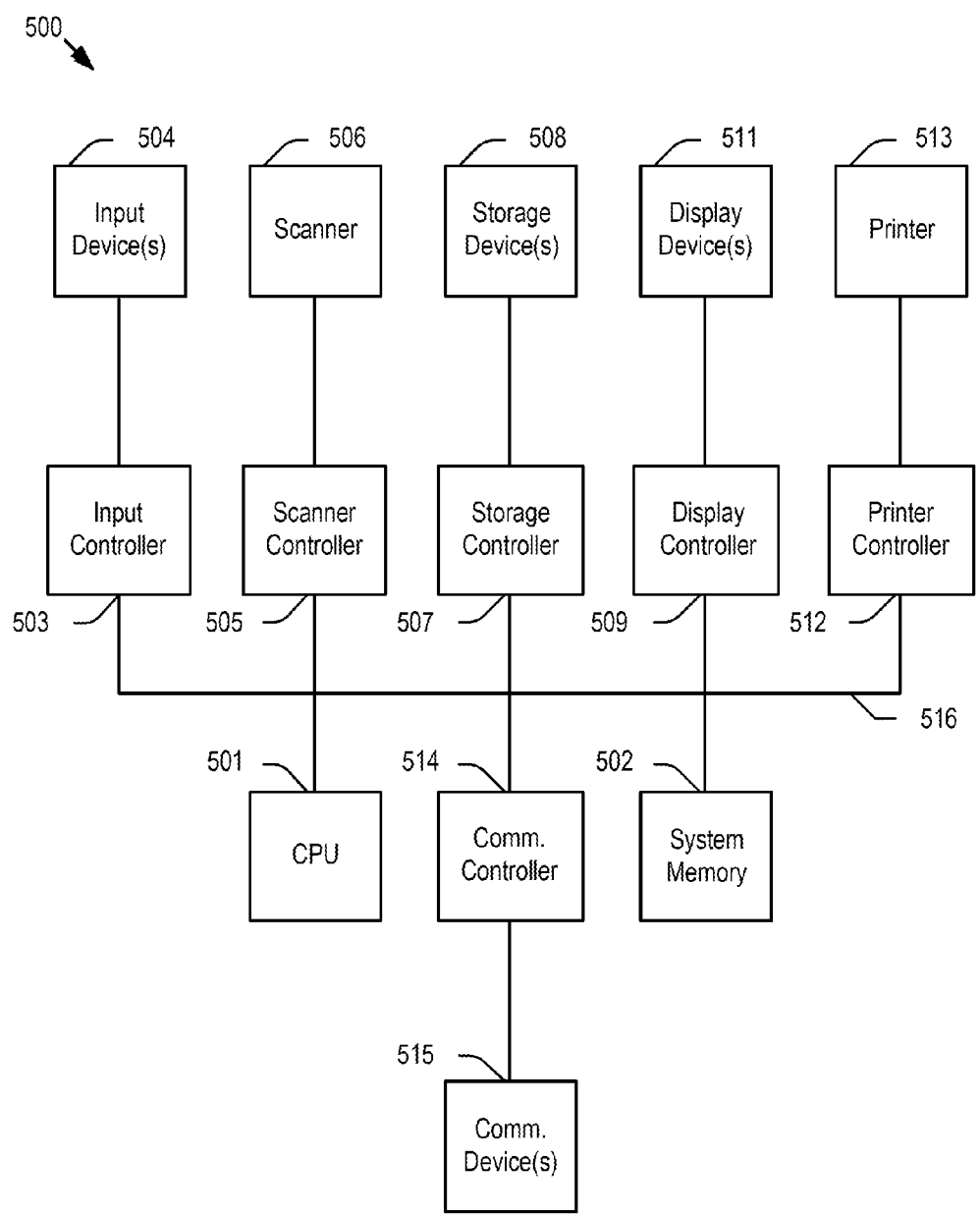
FIG. 5 shows an information handling system according to embodiments of the present invention.

FIG. 5 depicts a simplified block diagram of an information handling system 500 according to embodiments of the present invention. It will be understood that the functionalities shown for system 500 may operate to support various embodiments of an information handling system (or node)— although it shall be understood that an information handling system may be differently configured and include different components. As illustrated in FIG. 5, system 500 includes a central processing unit (CPU) 501 that provides computing resources and controls the computer. CPU 501 may be implemented with a microprocessor or the like, and may also include a graphics processor and/or a floating point coprocessor for mathematical computations. System 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus. There may also be a scanner controller 505, which communicates with a scanner 506. System 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. Storage device(s) 508 may also be used to store processed data or data to be processed in accordance with the invention. System 500 may also include a display controller 509 for providing an interface to a display device 511, which may be a cathode ray tube (CRT), a thin film transistor (TFT) display, or other type of display. System 500 may also include a printer controller 512 for communicating with a printer 513. A communications controller 514 may interface with one or more communication devices 515, which enables system 500 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. An information handling system node for monitoring a communication connectivity between applications, comprising:
   one or more processors;
   a memory communicatively coupled to the one or more processors;
   one or more network interfaces communicatively coupled to the one or more processors; and
   an agent communicatively coupled to the one or more network interfaces and configured to:
      receive, at an agent that monitors communication connectivity, a registration corresponding to each application of a plurality of applications operating on the information handling system node, wherein the registration is received via a proxy terminator responsive to the proxy terminator acting as an intermediary between an application and the agent and is received via an application when a proxy terminator is not acting as an intermediary between the application and the agent;
      monitor a liveliness status of a communication session between the agent and a remote agent operating on a remote information handling system node, the communication session being enabled via at least one of the one or more network interfaces; and
      responsive to detecting, based on the liveliness status, that a fault exists, notify each application of the plurality of applications registered with the agent that is affected by the fault that the fault exists.

2. The information handling system node as recited in claim 1, wherein the registration is achieved using one or more socket calls.

3. The information handling system node as recited in claim 1, wherein the agent is configured to detect that the fault exists when the agent fails to receive an acknowledgement signal during a preset time interval from the remote agent.

4. The information handling system node as recited in claim 1 wherein:
   the proxy terminator is configured to register with the agent such that the application need not directly register with the agent.

5. The information handling system node as recited in claim 4, wherein the step of responsive to detecting, based on the liveliness status, that a fault exists, notify each application of the plurality of applications registered with the agent that is affected by the fault that the fault exists comprises:
   responsive to the fault affecting an application that registered with the agent via the proxy terminator, notifying the proxy terminator that the fault exists; and
   the proxy terminator is configured to notify the application that the fault exists.

6. The information handling system node as recited in claim 1, wherein the agent is configured to operate using a bidirectional forwarding detection protocol.

7. An information handling system node for monitoring a communication connectivity between applications, comprising:
   one or more processors;
   a memory communicatively coupled to the one or more processors;
   one or more network interfaces communicatively coupled to the one or more processors; and an agent communicatively coupled to the one or more network interfaces and configured to:
 receive, at an agent that monitors communication connectivity, a registration corresponding to each application of a set of applications, wherein the registration is received via a proxy terminator responsive to the proxy terminator acting as an intermediary between an application and the agent and is received via an application when a proxy terminator is not acting as an intermediary between the application and the agent;
 monitor a liveliness status of a communication session between the agent and a remote agent operating on a remote information handling system node, the communication session being enabled via at least one of the one or more network interfaces; and
 responsive to detecting, based on the liveliness status, that a fault exists, notify each application from the set of applications registered with the agent that is affected by the fault that the fault exists.

8. The information handling system node as recited in claim 7, wherein the registration is achieved using or more socket calls.

9. The information handling system node as recited in claim 7, wherein the agent is configured to detect the fault when the agent fails to receive an acknowledgement signal during a preset time period from the remote agent.

10. The information handling system node as recited in claim 9, wherein a set of remote applications are registered with the remote agent and one or more of the set of applications are adapted to communicate with one or more of the set of remote applications.

11. The information handling system node as recited in claim 7 wherein:
 the proxy terminator is configured to register with the agent such that an application that uses a proxy terminator need not directly register with the agent.

12. The information handling system node as recited in claim 7, wherein the agent is configured to operate using a bidirectional forwarding detection protocol.

13. The information handling system node as recited in claim 11, wherein:
 the agent is configured to, responsive to the fault affecting an application that registered with the agent via the proxy terminator, notify the proxy terminator that the fault exists; and
 the proxy terminator is configured to notify the application that the fault exists.

14. The information handling system node as recited in claim 7, wherein:
 responsive to the application using Transmission Control Protocol (TCP), the proxy terminator is configured to generate a TCP Reset to notify the application that the fault exists; and
 responsive to the application using User Datagram Protocol (UDP), the proxy terminator is configured to generate an Internet Control Message Protocol (ICMP) unreachable message to notify the application that the fault exists.

15. A non-transitory tangible computer-readable medium or media comprising one or more sequences of instructions which, when executed by one or more processors, causes steps to be performed comprising:
 receiving, at an agent that monitors communication connectivity, a registration corresponding to each application from a set of applications operating on an information handling system node, wherein the registration is received via a proxy terminator responsive to the proxy terminator acting as an intermediary between an application and the agent and is received via an application when the proxy terminator is not acting as an intermediary between the application and the agent;
 monitoring a liveliness status of a communication session with a remote agent operating on a remote information handling system node; and
 responsive to detecting, based on the liveliness status, that a fault exists, notify each application from the set of applications registered with the agent that is affected by the fault that the fault exists.

16. The non-transitory tangible computer-readable medium or media of claim 15 wherein the registration is achieved using one or more socket calls.

17. The non-transitory tangible computer-readable medium or media of claim 15 wherein the registration that is received via the proxy terminator that is configured to register with the agent such that the application need not be modified to directly register with the agent.

18. The non-transitory tangible computer-readable medium or media of claim 17 wherein the step of responsive to detecting, based on the liveliness status, that a fault exists, notify each application from the set of applications registered with the agent that is affected by the fault that the fault exists comprises:
 responsive to the fault affecting an application that registered with the agent via the proxy terminator, notifying the proxy terminator that the fault exists and the proxy terminator is configured to notify the application that the fault exists.

19. The non-transitory tangible computer-readable medium or media of claim 17 wherein the agent is configured to operate using a bidirectional forwarding detection protocol.

20. The non-transitory tangible computer-readable medium or media of claim 15 further comprising one or more sequences of instructions, when executed by the one or more processors, causes steps to be performed comprising:
 establishing an alternative communication path for the communication session responsive to the information handling system node not being isolated due to the fault.

* * * * *